United States Patent [19]
Glynn et al.

[11] Patent Number: 5,743,782
[45] Date of Patent: *Apr. 28, 1998

[54] ILLUMINABLE TOYS HAVING REPLACABLE ILLUMINABLE EDIBLES

[75] Inventors: Kenneth P. Glynn, Raritan Township, Hunterdon County; James R. Blair, II, Phillipsburg, both of N.J.

[73] Assignee: Ideal Ideas, Inc., Flemington, N.J.

[ * ] Notice: The term of this patent shall not extend beyond the expiration date of Pat. No. 5,545,069.

[21] Appl. No.: 596,987

[22] Filed: Feb. 5, 1996

Related U.S. Application Data

[63] Continuation-in-part of Ser. No. 410,055, Mar. 24, 1995.
[51] Int. Cl.$^6$ .................................................. A63H 3/50
[52] U.S. Cl. .................. 446/485; 446/73; 446/219; 446/386; 362/253; 362/806; 362/808
[58] Field of Search ..................... 446/71–73, 75, 446/76, 79, 219, 386, 485; 362/253, 806, 808; 426/104; 40/410, 411, 406, 444

[56] References Cited

U.S. PATENT DOCUMENTS

| | | | |
|---|---|---|---|
| 328,867 | 10/1885 | Van Leeawen | 426/104 |
| 1,574,071 | 2/1926 | Dvorsky . | |
| 2,043,200 | 6/1936 | Linderman, Jr. | 40/444 |
| 2,085,414 | 6/1937 | Cavanagh | 446/73 |
| 2,532,729 | 12/1950 | Millstein . | |
| 2,663,866 | 12/1953 | Simpson . | |
| 2,815,439 | 12/1957 | Plubell . | |
| 4,508,512 | 4/1985 | Grisch et al. | 446/73 |
| 4,593,817 | 6/1986 | Ferrero | 446/73 |
| 4,914,748 | 4/1990 | Schlatta, IV et al. | 362/109 |
| 4,978,030 | 12/1990 | Morris et al. | 446/72 |
| 5,117,338 | 5/1992 | McCrary | 362/104 |
| 5,386,909 | 2/1995 | Spector | 446/73 |
| 5,439,407 | 8/1995 | Friedel | 446/485 |
| 5,471,373 | 11/1995 | Coleman et al. | 362/253 |

FOREIGN PATENT DOCUMENTS 5153911   6/1993   Japan .

Primary Examiner—Robert A. Hafer
Assistant Examiner—Jeffrey D. Carlson
Attorney, Agent, or Firm—Kenneth P. Glynn, Esq.

[57] ABSTRACT

The illuminable toy has replaceable, illuminable edibles, that can be soft or hard crystal candy or any other translucent or transparent food in a figure form which is attached to a holder which is in turn part of or attached to a base. Concealed inside the base are a light source and battery connected to an electrical switch. There are sets of holders having the same size and shape which match to corresponding sets of illuminable edibles having protrusions of the same size and shape. Connected to the base is a cover, which in combination with the inserted illuminable edibles simulates a scene, such as a horror house, a mine cave or a winter scene.

20 Claims, 5 Drawing Sheets

ILLUMINABLE TOYS HAVING REPLACABLE ILLUMINABLE EDIBLES

REFERENCE TO RELATED APPLICATION

This application is a Continuation-In-Part of currently pending U.S. patent application Ser. No. 08/410,055, filed on Mar. 24, 1995 and entitled "Illuminable Toys and Simulations with Replaceable Illuminable Edibles" by the inventors herein.

BACKGROUND OF THE INVENTION

1. Field of the Invention

The present invention involves toys with several illuminable edibles as a simulation toy.

2. Information Disclosure Statement

The combination of illuminable edibles illumined by a switchable battery powered light source to make a partially enclosed scene has not been taught by the prior art. The teaching of edibles as a toy component has been limited to simple configurations such as candy necklaces, candy rings, simple candy containers and simple flashlight candy illumination.

CE DE CANDY INC., teaches the use of edibles resembling miniature donuts, sold under the registered trademark "SMARTIES", strung together and sold as a necklace.

U.S. Pat. No. 2,532,729 issued to Millstein, involved a transparent container formed and colored like the body of Santa Claus open at the top and having a closure in the form of the head of Santa Claus. The head threaded onto the body in such a manner that less than half a turn was needed to assure a tight connection. Inside the transparent container or body were multi-colored candies.

U.S. Pat. No. 2,085,414 issued to Cavanagh, involved a container for packaging candies for children. The container simulated the face of a character, such as a person, with eye-like openings. Adjustments on the container provided for the rearranging of the colored candies inside to change the colors of the eye-like openings for amusement.

U.S. Pat. No. 4,508,512 issued to Girsch et al., involved a shape-matching toy with a first plate having a plurality of different shape apertures therein and a plurality of block elements of corresponding shapes which are receivable in the apertures.

U.S. Pat. No. 4,978,030 issued to Morris et al., involved a candy container configured as a fowl or the like with the contained candy shaped like an egg. Squeezing or compressing the container caused an egg to be ejected from an orifice on the bottom of the container and simultaneously generating air pressure to activate a reed-type sound generator located in the bill of the container.

U.S. Pat. No. 1,574,071, issued to Dvorsky involved a dispensing container for cigars, cigarettes and like small cylindrical objects. The container employed interconnected idler wheels, string and pulleys, springs, screws and linkages to segregate one article from the container by depressing a single key.

U.S. Pat. No. 4,593,817, issued to Ferrero involved a container for food products consisting of two trough shaped bodies which could be joined together releasably at their complementary free edges. One of the free edges had a notch which defined a slot with the other free edge when the bodies were joined together. The two bodies had appendages shaped so as to give the container an animal-like appearance, and some of the appendages served to support the container with the slot facing upwards.

U.S. Pat. No. 5,386,909, issued to Spector, involved a display package housing a cylindrical, transparent container whose externally-threaded neck received a screw-on cap. The container could be filled with shaped candy pieces having a figurative form such as that of miniature bears. The package was a hollow plastic figure whose form was similar to that of the smaller shaped candy pieces inside the container.

U.S. Pat. No. 4,914,748 to Schlotter, IV et al. discloses a novelty flashlight and piece of candy for illumination. The device includes a replaceable candy cylinder attached to the end of a flashlight which is turned on to make the candy cylinder glow brightly while being consumed. The device is provided with a removable clear plastic cover which is placed over the candy and secured in place at one end.

U.S. Pat. No. 5,117,338 to McCrary is directed to a lighting device mounted within a jewelry setting which is directed at a facet of a gemstone to increase the brilliance and brightness of the gemstone. In a preferred embodiment, the light source is radioluminescent or electroluminescent and uses various focusing means to focus the light from the lighting means.

U.S. Pat. No. 2,815,439 to Plubell describes and illustrates an ornamental Easter egg basket including a hollow base having an upper bead as the upper peripheral edge of the base and a lower bead as the lower peripheral edge of the base. There is also a removable top wall press-fitted into position within the top opening of the base, a plurality of openings in the top wall, a removable electric socket in each of the openings, means connecting the sockets to a source of electrical energy and an ornamentally decorated, translucent, egg-shaped globe supported on the top wall and overlying each bulb.

U.S. Pat. No. 328,867 to Van Leeuwen discloses translucent picture candy including characters or figures indented thereon to different depths, so that when the candy is held up to the light the character or figure will appear in shaded lines.

U.S. Pat. No. 2,663,866 to Simpson discloses an illuminated attachment for tumblers including a body member having an attachment mechanism for attaching the attachment to the bottom of a tumbler. The body member has an inwardly extending flange, a plate adapted to be supported by the flange and a lamp bulb socket connected to the plate. The plate has a central opening to provide access to the socket and a lamp bulb fitted into the socket, a contact member having a sleeve projection adapted to enter the top end of the bottom sleeve portion. The sleeve portion of the contact member is vertically aligned with the socket and with the lamp bulb.

JP 405153911 to Ogawa discloses luminescent confectionery in which a light-transmittable confectionery is attached to a bar body having a luminescent element, an electric source for the element and a switch for the ON/OFF control of the source.

Notwithstanding the prior art, the combination of illuminable edibles illumined by a battery powered light source to make an enclosed scene taught by the present invention is neither taught nor rendered obvious thereby.

SUMMARY OF THE INVENTION

The present invention is a scene simulation toy having replaceable, illuminable edibles that can be crystal candy or other translucent or transparent food, in the form of crystals, characters such as Santa Claus, Easter Bunny and Eggs, or any other three dimensional figure. The replaceable, illuminable edibles are attached to holders which are in turn attached to a base. Concealed inside the base are a light source and battery connected to an electrical switch.

There are a plurality of sets of holders, with each set of holders having the same size and shape. Each set of holders matches to a corresponding set of replaceable, illuminable edibles with each set of replaceable illuminable edibles having a same sized and shaped protrusion, which is attached to a corresponding one of said holders. The replaceable illuminable edibles are illuminated by light emitted from the light source.

There is also a connecting means for connecting a cover to the base. The cover covers the replaceable illuminable edibles and has a three-dimensional configuration, which simulates a scene when the cover is connected to said base and said illuminable edibles are placed in said holders.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
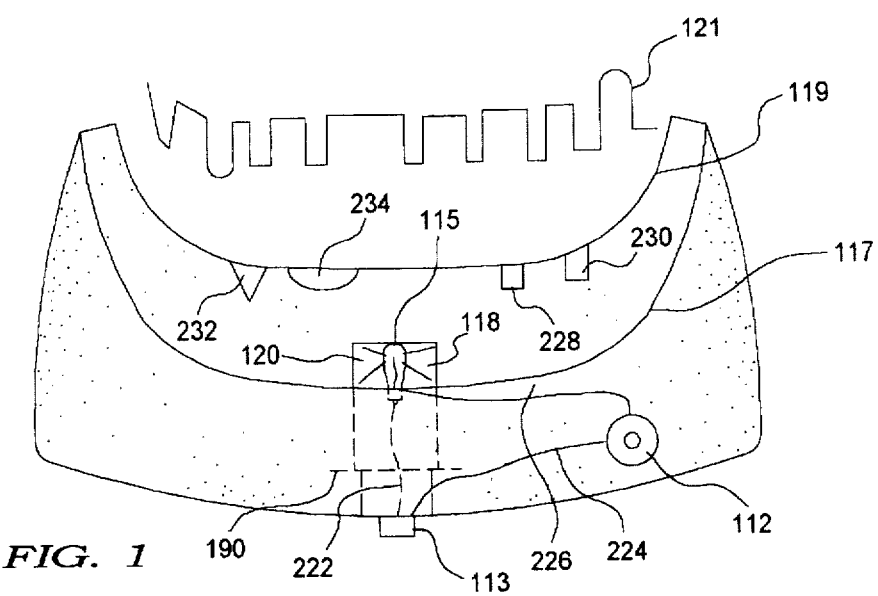
FIG. 1 is a cut away view of a base for a mining cave simulation toy with illuminable edibles.

The present invention entails a toy with illuminable edibles which can be consumed by children. The illuminable edibles can be inside a container simulating a scene such as a horror house, mining cave, winter scene and the like. The illuminable edibles are illumined to produce a brilliance or glowing effect by battery powered lights inside the handles or containers.

Typically, the illuminable edibles are frictionally attached to holders in the base. The holders may be protrusions or recesses which frictionally mate with corresponding recesses or protrusions in the illuminable edibles. The recesses and protrusions may be any number of shapes, including, but not limited to, rectangular, triangular or circular.

There are a plurality of different sets of holders having matching protrusions on a plurality of corresponding sets of illuminable edibles. Each set of holders and illuminable edibles has recesses and protrusions with the same size and shape. Different sets may have different sized and/or shaped recesses and protrusions. The different sets allow for a wide range in the size of the illuminable edibles.

There is a cover connected to the base. The cover may be threadedly attached, friction fitted, screwable, snap fitted or hingedly attached to the base. When the cover is attached to the base and the illuminable edibles are in place, a scene such as a mine cave, a haunted house or a winter scene are simulated.

The term "replaceable, illuminable edible" as used herein can mean a soft or hard crystal candy or other translucent or transparent food. These replaceable, illuminable edibles can be in the form of crystals, candy canes, ice cream cones, snow cones, eggs, Christmas trees, jack-o-lanterns, etc. or characters such as Santa Claus, a snowman, Rudolph the Red Nosed Reindeer, Easter Bunny, Frankenstein, a "wolfman", witch, vampire, etc. and animals, human characters and objects. The replaceable, illuminable edibles can be single colored or be of mixed colors.

The term "light permeated portion" as used herein can be a hole or opening in the base for permitting light emitted from a light source inside the base to pass through onto or into a replaceable, illuminable edible. Alternatively, the light permeated portion can be a transparent or translucent material in a top support surface of the base. The term "light source" as used herein can mean an incandescent lamp in which a filament is heated to incandescence by an electric current. "Battery" as used herein can mean an electrochemical based storage device for generating an electric current. The term "conductor" as used herein can mean an insulated or non-insulated material which provides a pathway for electric current. The term "switch" as used herein can mean a single pole single throw push button, toggle, rocker or slide-type electrical contact switch for making or breaking an electrical circuit.

The term "reflector" as used herein can mean a reflector having a shape that is flat, near parabolic or parabolic. The reflecting surface can be a polished or plated metal or plastic surface.

Shown in FIG. 1 is a partially cut away view of a base 111 for a mining cave simulation toy with illuminable edibles. The switch 113 is electrically connected through conductor 224 to a battery 112 and through conductor 222 to a light source 115. The light source 115 is electrically connected through conductor 226 to the battery 112.

The base has a top support surface 119 with recessed holders 228, 230, 232, 234 which friction fit with protrusions 173, 153, 143 and 164 on replaceable illuminable edibles such as 171, 151, 141 and 161 respectively. (See FIGS. 7, 8, 9 and 10). As shown, the protrusions and recesses may be triangular, circular, rectangular or the like. The top support surface 119 may be an entire light permeated portion or have smaller light permeated portions.

There is a plurality of sets 228 and 230, 232, 234 of recessed holders. Each set has holders with the same size and shape and is matched to a corresponding set 141 and 151, 161, 171 of illuminable edibles having matched protrusions 143, 163, 153 and 173.

Shown in FIG. 1 is an optional reflector 117 which encircles the bulb portion of light source 115 and is attached to the base under the light permeated portion or top support surface 119. Also shown is an optional clear plastic overlay insert 121 which is molded to fit over the top surface 119 and into the recessed holders 228, 230, 232 and 234. This clear plastic overlay can be washable and replaceable to permit new illuminable edibles to be placed into a clean base 111. Moreover, this type of clear plastic overlay can be employed as an option in any simulation toy with illuminable edibles, including those depicted in FIGS. 13 and 15.

Figure 2:
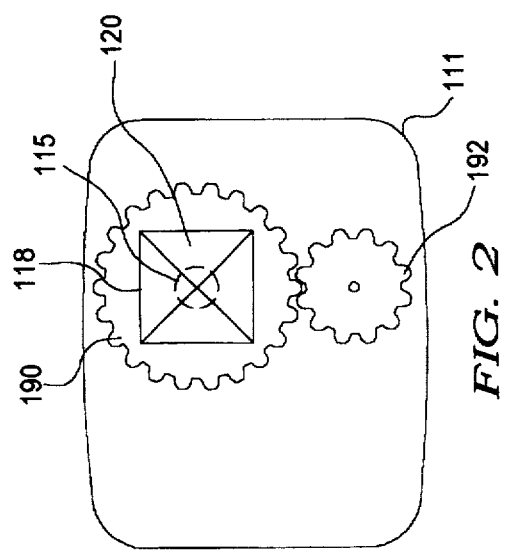
FIG. 2 is a top view of the base for a mining cave simulation toy with illuminable edibles having a color wheel placed over a light source.

Surrounding the light source 115 is an optional transparent color wheel 118 which has portions 120 of different colors. Referring now to FIG. 2, there is shown a gear mechanism 190 attached to the bottom of the color wheel 118 which is moved by another gear mechanism 192 which can be accessed from a side of the base 111. The movement of the gear mechanism 192 causes rotation of the color wheel 118 around the light source 115.

Figure 3:
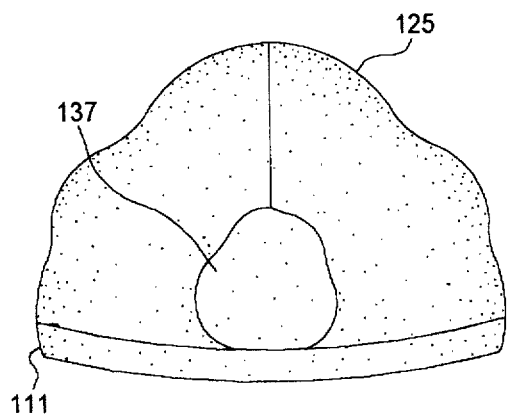
FIG. 3 is a front view of the simulation toy in FIG. 1 with a sides opening cover model.

Shown in FIG. 3 is a front view of a side opening cover 125 for the base 111 detailed in FIG. 1. The cover 125 is near dome-shaped. The outside and inside surfaces of the cover 125 may be textured to simulate rock formations in a mining cave and may be opaque. There is a cutout portion 137 on the cover 125 which allows for viewing the illuminable edibles.

Figure 4:
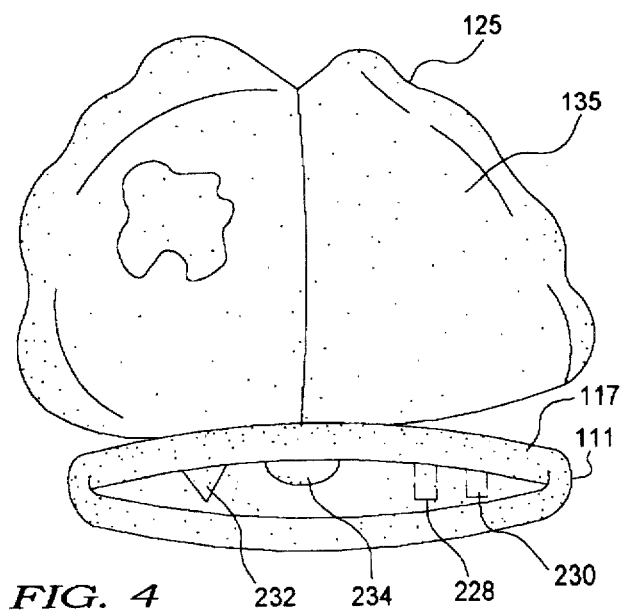
FIG. 4 is a front view of the cover in FIG. 3 with the sides open.

FIG. 4 shows how the side opening cover 125 would appear opened to provide access to any replaceable, illuminable edibles inside the cover 125. An inner portion 135 of the cover 125 may be made out of a reflective material.

Figure 5:
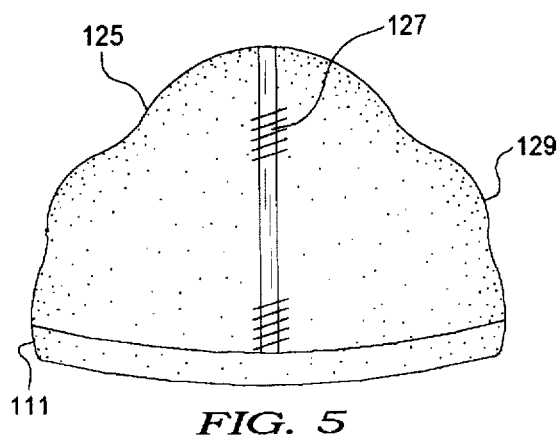
FIG. 5 is a rear view of the cover in FIGS. 3 and 4.

FIG. 5 shows a possible hinge attachment arrangement for the side opening cover of FIGS. 3 and 4. Hinge 129, attached to both sides of the cover 125 at the bottom, is also attached to the base 111. Hinge 127 is attached to both sides of the cover 125 to provide added stability. If the rear of the cover 125 is not flexible, than the two hinges 127 and 129 must be vertically aligned to properly function in unison.

Figure 6:
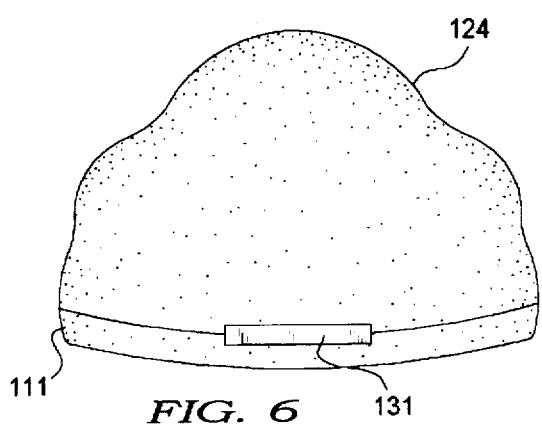
FIG. 6 is a rear view of the simulation toy in FIG. 1 with a top opening cover model.
Figure 7:
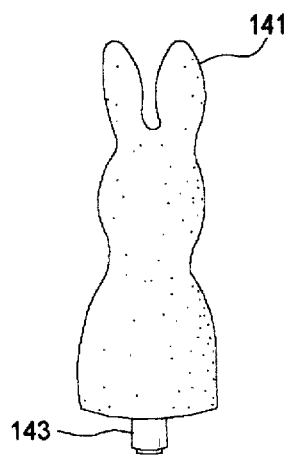
FIG. 7 is a side view of an illuminable edible figure for the simulation toy of FIG. 1.
Figure 8:
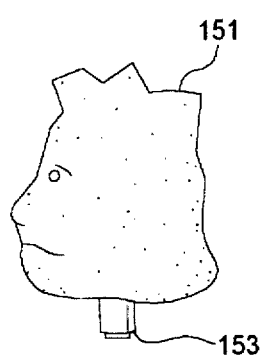
FIG. 8 is a side view of an illuminable edible figure for the simulation toy of FIG. 1.
Figure 9:
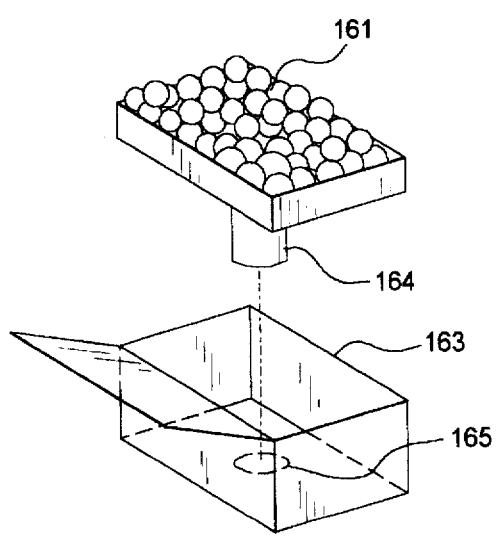
FIG. 9 is a side view of an illuminable edible figure for the simulation toy of FIG. 1.
Figure 10:
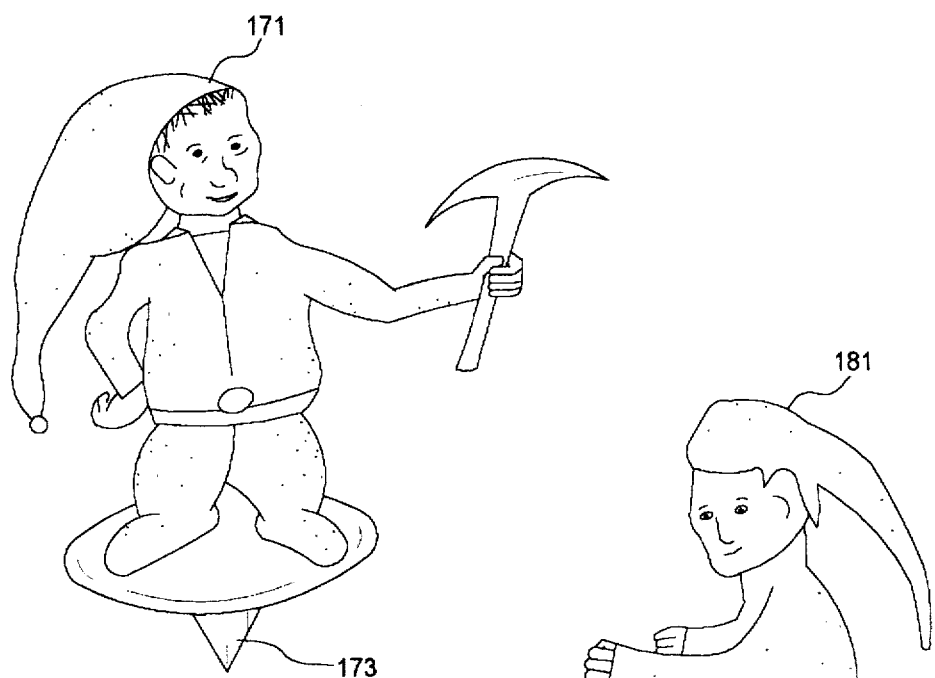
FIG. 10 is a front view of an illuminable edible figure for the simulation toy of FIG. 1.
Figure 11:
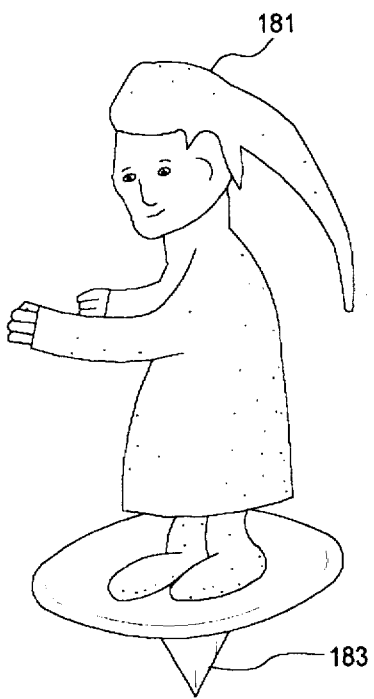
FIG. 11 is a side view of an illuminable edible figure for the simulation toy of FIG. 1.

FIG. 6 depicts a top opening cover 124 embodiment, whereby a single hinge 131 is attached to the base 131. The advantage of this embodiment over the two hinged cover version in FIG. 5, is that the cover 124 can be irregularly shaped to better simulate a mining cave and still permit the single hinge 131 to properly open and close the cover.

Depicted in FIGS. 7, 8, 9, 10 and 11 are embodiments of replaceable, illuminable edibles for the mining cave simulation toy of FIGS. 1, 2, 3, 4, 5 and 6. Replaceable illuminable edible 141 simulates a stalagmite deposit on a cave floor. The protrusion portion 143 can be friction fitted into one of the holder recesses 228 or 230 in FIG. 9. Replaceable, illuminable edible 151 simulates a gem cluster whose protrusion 153 can be friction fitted into a recessed holder like 234 shown in FIG. 4. Replaceable, illuminable edible 161 is a translucent candy simulating a treasure which is inserted into a plastic molded treasure chest 163 with a hole at the bottom that allows the protrusion 164 to be inserted into a recessed holder like 228 or 230 in FIG. 4. Replaceable, illuminable edibles, 171, a miner, and 181, a gem inspector, have protrusions 173 and 183 respectively, also being edible, which can be inserted into recessed holders like 232 shown in FIG. 4.

Figure 12:
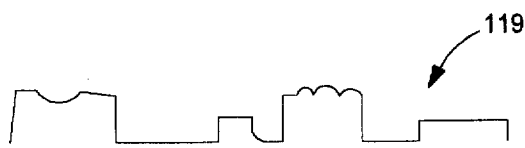
FIG. 12 is a side view of a top support surface for the simulation toy of FIG. 1.

FIG. 12 shows a side view of the top surface 119 shown in FIG. 1. As shown, the top surface 119 has varying heights which simulates the topography of the land.

Figure 13:
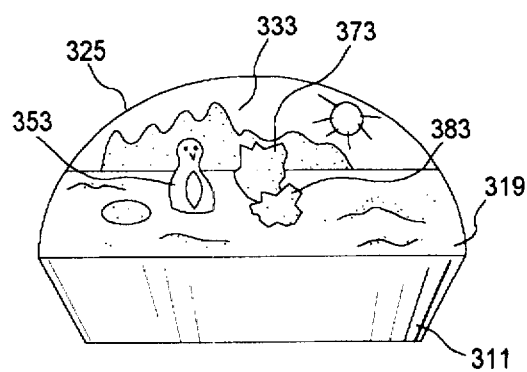
FIG. 13 is a cut away view of a base for a winter scene simulation toy with illuminable edibles.

Shown in FIG. 13 is a partially cut away view of a base 311 for a winter scene simulation toy with illuminable edibles. The switch 313 is electrically connected through conductor 324 to a battery 312 and through conductor 322 to a light source 315. The light source 315 is electrically connected through conductor 326 to the battery 312.

Figure 14:
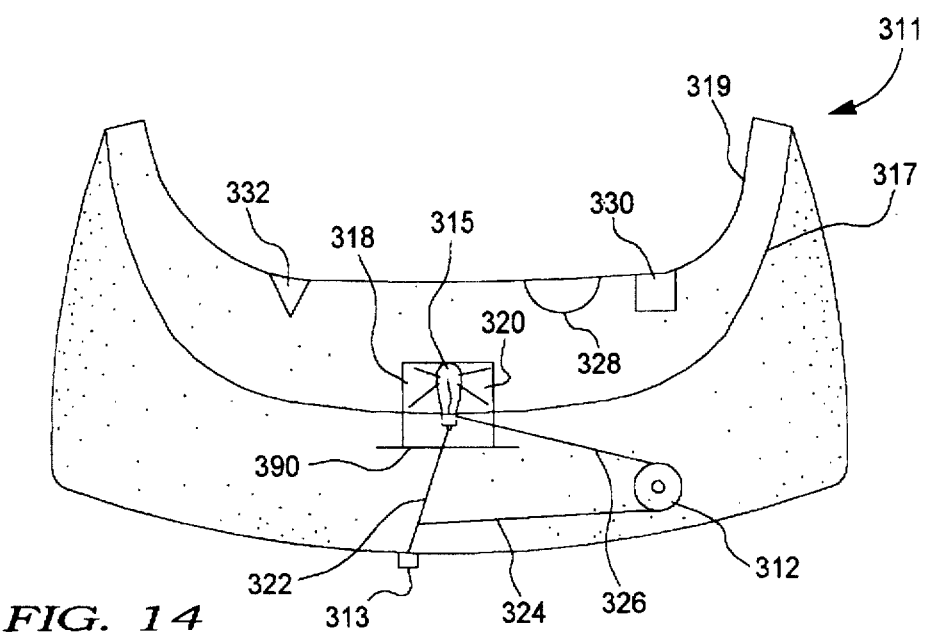
FIG. 14 is a front view of the simulation toy of FIG. 13.

The base 311 has a top support surface 319 with recessed holders 328, 330, and 332 which friction fit with protrusions on replaceable illuminable edibles 353, 373, 383 shown in FIG. 14. As shown, the protrusions and recesses may be triangular, circular, rectangular or the like. The top support surface 319 may be an entire light permeated portion or have smaller light permeated portions.

Shown in FIG. 13 is an optional reflector 317 which encircles the bulb portion of light source 315 and is attached to the base under the light permeated portion or top support surface 319. There is also an optional transparent color wheel 318 which has portions 320 of different colors and is placed over the light source 315 and may rotate around the light source 315. The rotation is caused by a pair of gears, one gear 390 and another gear (not shown) which mates with the gear 390 and is accessed and turned from a side of the base 311.

Shown in FIG. 14 is a front view of the illuminable toy simulating a winter scene whose base is shown in FIG. 13. There is a scene 333 painted on the back of the illuminable toy. A cover 325 is threadedly connected to the base 311. As shown, there are a plurality of illuminable edibles 353, 373, and 383 and the cover 325 is dome-shaped.

Figure 16:
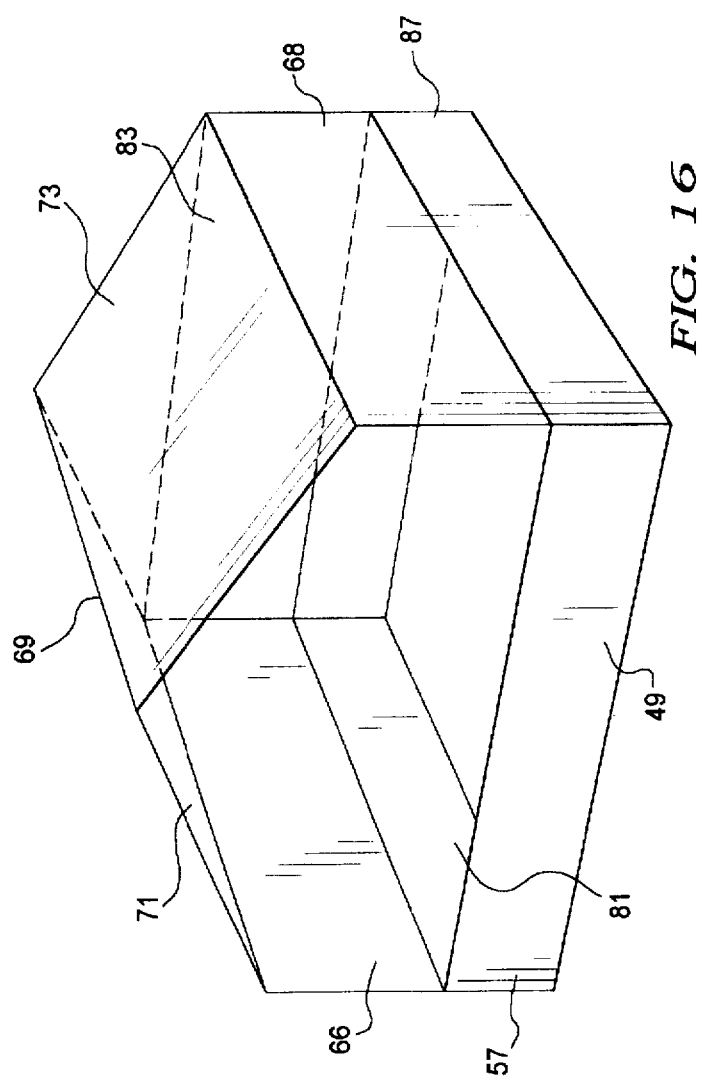
FIG. 16 is a perspective view of the simulation toy shown in FIG. 15.
Figure 15:
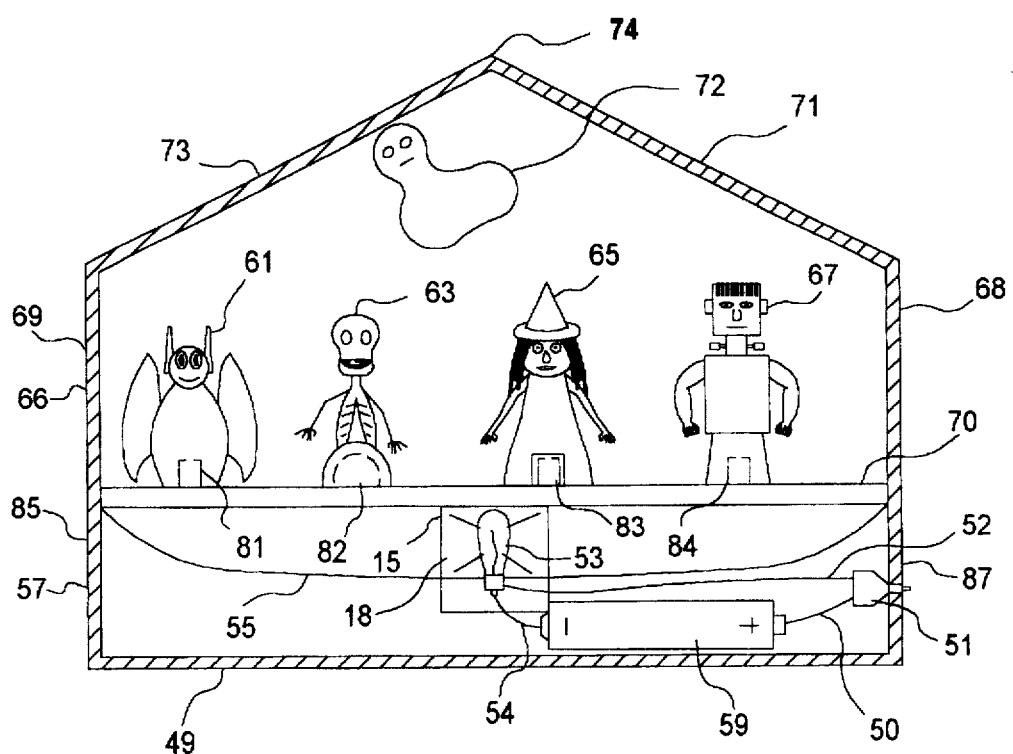
FIG. 15 is a partially cut view of a horror house simulation toy with illuminable edibles.

Shown in FIGS. 15 and 16 is an illuminable toy simulating a horror house. Inside the base 57 is a light source 53 electrically connected through conductor 52 to switch 51 and electrically connected through conductor 54 to an anode of a battery 59. The switch 51 is connected through conductor 50 to an anode of battery 51.

The base 57 has a removable access cover 49 and a top support surface 70 which has integrally formed protrusions 81, 82, 83, and 84 that friction fit into corresponding recesses in the replaceable, illuminable edibles 61, 63, 65 and 67 respectively. Also shown is a plastic illuminated accessory 72, attached to rooftop portion 73 simulating a flying ghost. Alternatively, the plastic accessory 72 can be a glow-in-the-dark material.

The entire top support surface 70 is a light permeated portion made of a translucent material which diffuses the incandescent light emitted by light source 53. In an alternative embodiment, the top support surface 70 can be opaque, with smaller light permeated portions under the replaceable illuminable edibles 61, 63, 65 and 67, thereby increasing the concentration of light into, and enhancing the illuminating or glowing effect of, the replaceable, illuminable edibles. Shown is an optional reflector 55 encircling the bulb portion of light source 53. The reflector 55 is attached to the base 57 under the light permeated portion of the top support surface 70. There is also an optional transparent color wheel 15 which is placed over the light source 53 and has portions 18 of different colors. The color wheel may rotate through gear mechanisms as described in FIG. 2.

Resting atop the base 57 walls is a three dimensional polygonal-shaped cover 69 with sidewall portions 66 and 68, roof tops 71 and 73 and a backwall 83. A front 81 of the cover 69 is open thereby permitting retrieval access and viewing access to illuminable edibles 61, 63, 65 or 67. The cover 69 may be force fitted into the base 57.

Shown in FIG. 16 is a perspective view of the illuminable edible toy of FIG. 15 without the illuminable edibles. The cover 69 includes sidewalls 66, 68, a bottom 81, roof portions 71,73 and a back 83. The base includes a cover 49, sidewalls 85, 87, a bottom (not shown) and a back (not shown).

Obviously, numerous modifications and variations of the present invention are possible in light of the above teachings. For example, the holders could be protrusions while the illuminable edibles could have corresponding recesses. It is therefore understood that within the scope of the appended claims, the invention may be practiced otherwise than as specifically described herein.

What is claimed is:

1. An illuminable toy comprising:

(a) at least one light source;

(b) at least one battery, said battery being electrically connected to said at least one light source;

(c) a switch, said switch being electrically connected to said at least one light source and said at least one battery, said switch providing an on/off adjustment for energizing and de-energizing said at least one light source with said at least one battery;

(d) a base, said base containing said at least one light source and said at least one battery and said switch, said base having at least one light permeated portion for allowing passage of light emitted from said at least one light source, said switch being adjustable from exterior side of said base;

(e) a plurality of sets of holders, each set of holders having the same size and shape, each holder being attached to said base;

(f) a plurality of sets of replaceable, illuminable edibles, each set of replaceable illuminable edibles having a same sized and shaped protrusion and being illuminated by light emitted from said at least one light source, said protrusion being attached to a corresponding one of said holders;

(g) connecting means for connecting a cover to said base, and (h) a cover for covering said plurality of replaceable, illuminable edibles and having a three dimensional configuration, wherein a scene is simulated when said cover is connected to said base and said illuminable edibles are placed in said holders.

2. The illuminable toy of claim 1 further including a washable clear plastic overlay, said clear plastic overlay being molded to fit over said base and over said holders.

3. The illuminable toy of claim 2 further including a reflector, said reflector being attached to said base and under said at least one light permeated portion and encircling the bulb portion of said at least one light source.

4. The illuminable toy of claim 3 further including a transparent color wheel having different color portions and being placed over said at least one light source and being attached to a first gear mechanism which mates with a second gear mechanism, said second gear mechanism being accessible from a side of said base for axial movement which causes rotation of said color wheel around said light source.

5. The illuminable toy of claim 4 wherein said cover is a three-dimensional polygon.

6. The illuminable toy of claim 5 wherein said scene is a haunted house.

7. The illuminable toy of claim 4 wherein said cover is dome-shaped.

8. The illuminable toy of claim 7 wherein said scene is a mine cave.

9. The illuminable toy of claim 8 wherein said cover is partially opaque.

10. The illuminable toy of claim 7 wherein said scene is a winter scene.

11. The illuminable toy of claim 10 wherein said cover includes a scene on an inner portion.

12. The illuminable toy of claim 9 wherein said cover includes a reflective material on an inner portion.

13. The illuminable toy of claim 6 further comprising non-edible accessories, said non-edible accessories being attachable to at least one of said holders, said cover and said base.

14. The illuminable toy of claim 11 wherein said connecting means is a thread on a bottom perimeter of said cover and a corresponding thread insert on a top perimeter of said base.

15. The illuminable toy of claim 12 wherein said connecting means is a hinge attached to said base wherein said cover rotates vertically away from said base.

16. The illuminable toy of claim 13 wherein said connecting means is a force fit between said cover and said base.

17. The illuminable toy of claim 12 wherein said connecting means is a hinge vertically attached to said base so as to allow two sides of said cover to rotate horizontally apart, wherein said cover includes two sides.

18. The illuminable toy of claim 17 wherein a shape of said holders of said set are selected from the group consisting of rectangles, triangles and circles.

19. The illuminable toy of claim 18 wherein said cover has a cut out portion for viewing said illuminable edibles.

20. The illuminable toy of claim 2 wherein said washable clear plastic overlay is replaceable.

* * * * *